June 23, 1931.   R. S. GANS   1,811,006

MECHANISM FOR CONTROLLING BRAKES

Filed Feb. 3, 1928

INVENTOR.
Robert S. Gans.
BY
*Stuart C Barnes*
ATTORNEY.

Patented June 23, 1931

1,811,006

UNITED STATES PATENT OFFICE

ROBERT S. GANS, OF DETROIT, MICHIGAN, ASSIGNOR OF ONE-HALF TO JOHN J. GRABFIELD, OF DETROIT, MICHIGAN

MECHANISM FOR CONTROLLING BRAKES

Application filed February 3, 1928. Serial No. 251,533.

This invention relates to a mechanism for controlling brakes or the like, and has to do especially with mechanism adaptable for use with an automotive vehicle.

In my application Serial No. 234,119, filed November 18, 1927, I have shown and described a mechanism of the character above referred to. The present invention contemplates a mechanism which preferably operates on the same principle as the mechanism in the cited application, but which involves certain improvements.

According to the invention, a brake operating lever is provided which is associated with mechanism for applying and holding a brake of the vehicle in "on" position. The association is such that the lever can be moved without actuation of the brake applying mechanism. One object of the invention is the provision of a mechanism wherein accidental release of the brakes is prevented, and this is accomplished by a separable connection between the lever and some of the mechanism in such a way that the lever may be moved even while the brakes remain set. Another object of the present invention is the provision of a lever which can be placed out of the way so as to thus not interfere while the brakes remain applied. It is this separable connection which permits the lever to be moved out of the way of the passengers and seat while the brakes remain set.

Figure 4:
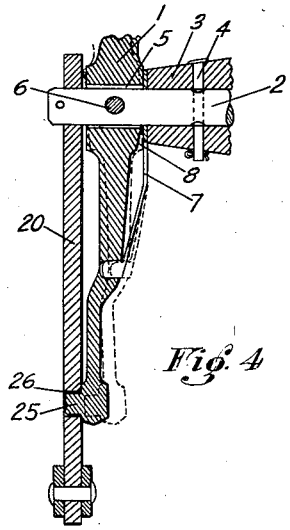
Fig. 4 is a sectional view taken on line 4—4 of Fig. 2.

The mechanism of this invention embodies a lever 1 which may extend through the floor boards of an automobile and which is pivoted preferably below the floor boards on a stud 2. Referring to Fig. 4 this stud 2 is shown as rotatably mounted in part of the transmission housing referenced 3, and is rotatably held therein by a suitable pin 4. The lever 1 is mounted so that it can be rocked in the plane extending axially of the pin, and for this purpose the lever may have a hole 5 fitting over the pin which is somewhat larger than the pin, and it may be locked to the pin by a transverse bolt or other suitable device 6.

A suitable spring 7 is preferably provided, here shown as a flat leaf spring, which urges the lever to the normal position shown by the full lines in Fig. 4. It will be noted by this arrangement that in the actuation of the lever to and from the dotted line positions shown in Fig. 5, the pin 2 is rocked in its mounting. It will also be noted that the lever can be rocked in the plane axially of the pin, which rocking takes place on the bolt 6 and which is permitted by reason of the large opening 5 in the lever. Thus, the lever can be rocked so that the lower end thereof takes the position of the lever shown in dotted lines in Fig. 4. This rocking movement takes place against the action of the spring.

It will be noted that the lever is provided with a slanting surface 8 which permits this rocking and which abuts against the leaf spring when the leaf spring is interposed as shown, or which would abut against the housing 3 if a different type of spring were used, to limit this rocking movement of the lever. Thus the lever is more or less universally mounted upon the pin.

The brake control mechanism actuated by this lever takes the form of a corrugated member 10 riveted or bolted, as shown at 11, to the frame or other stationary part of the vehicle. A brake rod 12 connects with the usual brakes, and the brake rod is more or less indirectly connected to the lever. These connections take the form of an intermediate member 13 which may advantageously consist of two spaced stampings, generally triangular in shape, with the brake rod pivoted to the member 13, as at 14. Disposed between these two stampings is a roller 15 mounted on pin 16 arranged to ride over the ridges 17 and furrows 18 of the corrugated member 10. Rotatably mounted upon the fulcrum pin 2 is a plate 20, the lower end of which is pivotally connected to the intermediate member 13, as at 21.

Figure 1:
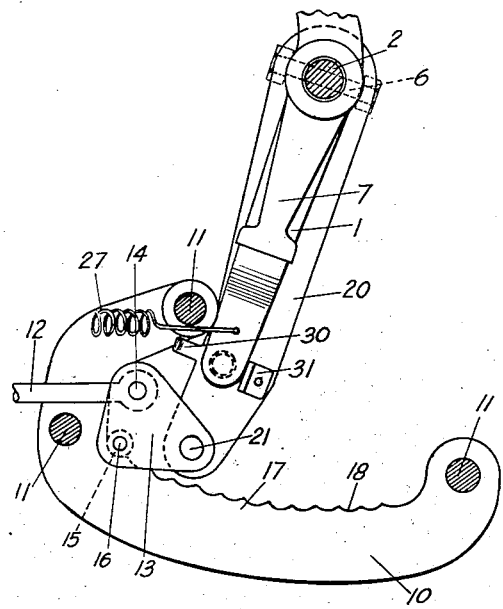
Fig. 1 is a side elevation with some of the mounting bolts and pivots shown in section, showing the pivotal mounting of the lever and the association between the lever and the brake applying mechanism.
Figure 2:
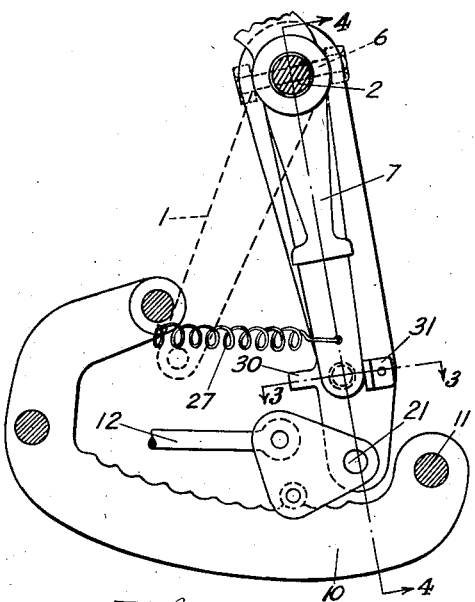
Fig. 2 is a view similar to Fig. 1 showing the position of the parts when the brakes are applied, and also showing in dotted lines the position the lever may be caused to assume while the brakes remain applied or set.

Assuming that the lower end of the lever 1 is connected to the plate 20 so that the actuation of the lever similarly moves the member 20, the above construction functions as follows: Fig. 1 shows the parts in brake released position; the lever 1 is now pulled rearwardly at its upper end by an operator thus moving the lower end of the lever and also the plate 20 from left to right until the parts assume a position which approximates that of Fig. 2, this figure showing substantially the extreme movement. During this action the roller 15 rides over the corrugated member 10 and finally seats in one of the furrows 18, as shown. In this position the brakes are on and the tension of the brakes pulls upon the rod 12. It will be noted that there are three vital points as regards the intermediate member 13, to wit: the connection with the brake rod 12, the connection with the plate 20, and the roller 15. These three points are arranged in a triangle. When the brakes are on, now viewing Fig. 2, the pull of the brakes is divided into components, as it tends to swing the intermediate member 13 around the pivotal connection 21. One component is a downward force of the roller 15 into one of the furrows, and the other component is an upward force at the pivotal connection 21 against the plate 20. This is due to the fact that the points 14 and 21 are out of alignment. Thus, the tension on the brakes holds the roller 15 securely in a furrow, and the brakes are held applied. The harder the pull of the brakes the more securely the roller is held in the furrow. The brakes can be released, however, by movement of the upper end of the lever.

Figure 5:
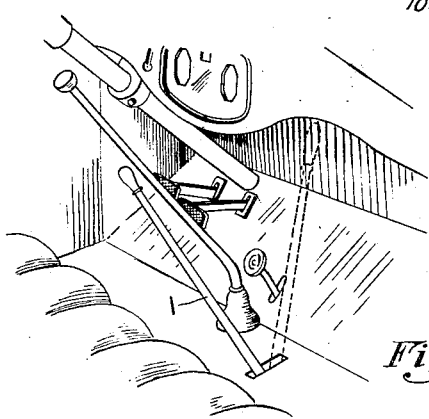
Fig. 5 is a perspective view of the driving compartment of an automobile showing two extreme positions of the brake operating lever.

When the brakes are thus applied, the lever is approximately in the position shown by the full lines in Fig. 5. The lever is not only in the way of the passengers and the driver, but an accidental forward push on the lever would release the brakes. However, the lever may now be disassociated from the remaining mechanism, and for this purpose a separable connection is provided between the lever and the plate 20. The lever is provided with a stud 25, (Figs. 3 and 4) whereas the plate 20 is provided with an opening 26 for receiving this stud. By rocking the lever on the bolt 6, the stud may be disconnected from the opening, as shown by the dotted line position in Fig. 4, whereupon the lever is free of the plate 20. The forward end of the lever may now be pushed to the dotted line position shown in Fig. 5, the lower end of the lever moving back to the dotted line position shown in Fig. 2. Thus, the lever is totally disconnected from the brake holding mechanism and it is also out of the way of the occupants of the car. Preferably, a spring 27 is associated with the lever so that when the stud 25 and recess 26 are disconnected the lever need be but released whereupon it automatically moves to the dotted line position shown in Fig. 5.

In order to release the brakes it is necessary to re-establish the connection between the lever and plate. For the purpose of aiding in this, the plate is preferably provided with an extension 30 which is curved so as to provide a camming surface for the stud. Immediately forward of the opening in the plate 20 is an abutment 31. It will be remembered that the leaf spring 7 normally urges the lever so that the stud 25 remains in the opening 26. As the lever is now pulled back by an operator, the stud engages the camming element 30, and the lever is swung on the bolt 6 as it rides over the camming surface. Further movement of the lever results in the lever striking the abutment 31 and the spring 7 then snaps the stud 25 into the opening 26. This re-establishes the connection, and the brake mechanism may be operated as desired.

It is not necessary every time the brakes are applied to thus disconnect the lever, as this need only be done at the will of the operator. So long as the lever and plate 20 are engaged the lever may be used to apply or release the brakes much in the normal manner, except however, no releasing action is required as in the pawl and ratchet construction, for all that is required is the pull and push of the lever. When, however, it is desired to get the lever out of the way when the brakes are applied, or when the automobile is to be left standing and it is desirable to prevent accidental release of the brakes, the lever may be disconnected.

Figures 3, 6:
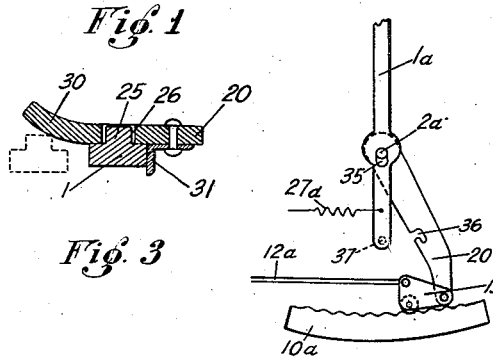
Fig. 3 is a section taken on line 3—3 of Fig. 2 showing the separable connection between lever and the brake mechanism.
Fig. 6 is a side elevational view of a modified form of the construction embodying a different type of separable connection between the brake operating mechanism and the lever.

A modified form of apparatus is shown in Fig. 6. Here the brake applying mechanism consists of a corrugated member 10a, brake rod 12a, which is connected to a plate 20a by an intermediate device 13a. The lever 1a, however, instead of being mounted so that it can be rocked, is provided with an elongated opening 35 where it is fulcrumed to pin 2a. The member 20a is provided with a bayonet slot 36, and the lower end of the lever with a pin 37. As shown in Fig. 6, the parts are in brake applied position with the lever 1a disconnected and pulled out of the way by the spring 27a. To release the brakes the lever is pulled upwardly, which is permitted by the elongated slot 35 so that the pin 37 may be received in the bayonet slot, whereupon it may be pushed down to establish a connection between the lever and the plate. When the brakes are again applied, the lever may be pulled upwardly slightly to permit the pin 37 to move out of the bayonet slot so that the lever may be disconnected and moved forwardly while the brakes remain applied.

The universal mounting of the lever as shown in Fig. 4, is an advantageous construction, but it is within the invention to mount this lever in any suitable manner, as for example, a ball and socket mounting, to permit its actuation for engagement and disengagement with the brake applying mechanism. Also the stud and opening connection between the lever in the form shown in Figs. 3 and 4, and the bayonet slot connection shown in Fig. 6 are exemplary of advantageous constructions, but it is within the invention to employ other types of separable connections if the same are found to be desirable or advantageous.

Claims:

1. A mechanism for controlling automobile brakes or the like comprising in combination, a lever movable toward and away from a seat of the automobile, a brake rod, intermediate mechanism connecting the brake rod and lever including interengaging devices. which lock by reason of pull by the brake rod when the brakes are applied, said lever being adapted to be pulled back towards the said seat of the automobile when the brakes are applied, and a separable connection between the lever and the said mechanism which permits the lever to be disconnected whereby the same can be moved independently of the said intermediate mechanism and away from the seat while the brakes are held applied by said interengaging devices.

2. A mechanism for controlling automobile brakes or the like, comprising in combination, a lever movable toward and away from a seat of the automobile, a brake rod, intermediate mechanism connecting the brake rod and lever including interengaging devices which lock by reason of pull on the brake rod when the brakes are applied, said lever being adapted to be pulled back towards the said seat of the automobile when the brakes are applied, and a separable connection between the lever and the said mechanism which permits the lever to be disconnected whereby the same can be moved independently of the said intermediate mechanism and away from the seat while the brakes are held applied by said interengaging devices, and a spring acting on the lever to automatically move the lever away from the seat when the same is released from said intermediate mechanism.

3. A mechanism for controlling brakes or the like comprising in combination, a permanently mounted control lever, a brake rod, intermediate mechanism connecting the lever and brake rod mounted independently of the lever, locking means included in this mechanism adapted to hold the brakes set against pull of the brake rod but which readily permits release of the brakes by actuation of the control lever, and a separable connection between the lever and mechanism whereby the said lever may be disconnected from the intermediate mechanism to prevent accidental release of the brakes by movement of the lever.

4. A mechanism for controlling brakes or the like comprising in combination, a permanently mounted control lever, a brake rod, intermediate mechanism connecting the lever and brake rod mounted independently of the lever, a locking device included in this mechanism adapted to hold the brakes set against pull of the brake rod, and independently of the control lever, but which readily permits release of the brakes by actuation of the control lever, and a separable connection between the lever and mechanism whereby the said lever may be disconnected from the intermediate mechanism to prevent accidental release of the brakes by movement of said lever.

5. A mechanism for controlling brakes or the like, comprising in combination with a pull rod, a pivotally mounted member, means providing a corrugated surface, an intermediate device connecting the pull rod and the pivoted member, said intermediate device having a portion which slidably engages the corrugated means, and said device being arranged so that the pull exerted by the rod seats the said means in a furrow of the said portion, a pivoted lever mounted independent of the said pivotally mounted member for actuating the said pivoted member to apply and release the brakes and a separable connection between this lever and the pivoted member.

6. A mechanism for controlling brakes or the like, comprising in combination with a pull rod, a pivotally mounted member, means providing a corrugated surface, an intermediate device connecting the pull rod and the pivoted member, said intermediate device having a portion which slidably engages the corrugated means, and said device being arranged so that the pull exerted by the rod seats the said means in a furrow of the said portion, a pivoted lever mounted independent of the pivotally mounted member for actuating the said pivoted member to apply and release the brakes and a separable connection between this lever and the pivoted member, said intermediate device being adapted to divide the pull of the rod into components one of which is down against the corrugated means and the other of which is against the pivoted means whereby to hold the brakes in position when said lever is disconnected.

7. A mechanism for controlling brakes or the like, comprising in combination, a member mounted on a fixed pivot point, a brake rod, a second member providing a corrugated surface, an intermediate device connecting the brake rod and said first member having a portion which contacts with the corrugated member, the arrangement being such that the brakes are applied by actuation of the first mentioned member and held applied by the pull of the brakes tending to swing the said intermediate device so that the said portion seats in a furrow in the corrugated member, a controlling lever, a fulcrum for the controlling lever upon which the lever is mounted to rock in a plane perpendicular to the axis of the fulcrum and in a plane parallel to the axis of the frame, and a separable connection between the lever of the said pivoted member adapted to be connected or disconnected by movement of the lever in one of the said planes of movement.

8. A mechanism for controlling brakes or the like comprising, a member mounted on a fixed pivot point, a brake rod, a second member providing a corrugated surface, an intermediate device connecting the brake rod and said first member having a portion which contacts with the corrugated member, the arrangement being such that the brakes are applied by actuation of the first mentioned member and held applied by the pull of the brakes tending to swing the said intermediate device so that the said portion seats in a furrow in the corrugated member, a controlling lever, a fulcrum for the controlling lever upon which the lever is mounted to rock in a plane perpendicular to the axis of the fulcrum and in a plane parallel to the axis of the frame, operable connections between the lever of the said pivoted member adapted to be connected or disconnected by movement of the lever in one of the said planes of movement, said lever when connected to the said second member actuating the same to apply or release the brakes.

In testimony whereof I affix my signature.

ROBERT S. GANS.